PROCESS OF MOLDING POLYURETHANE PLASTICS

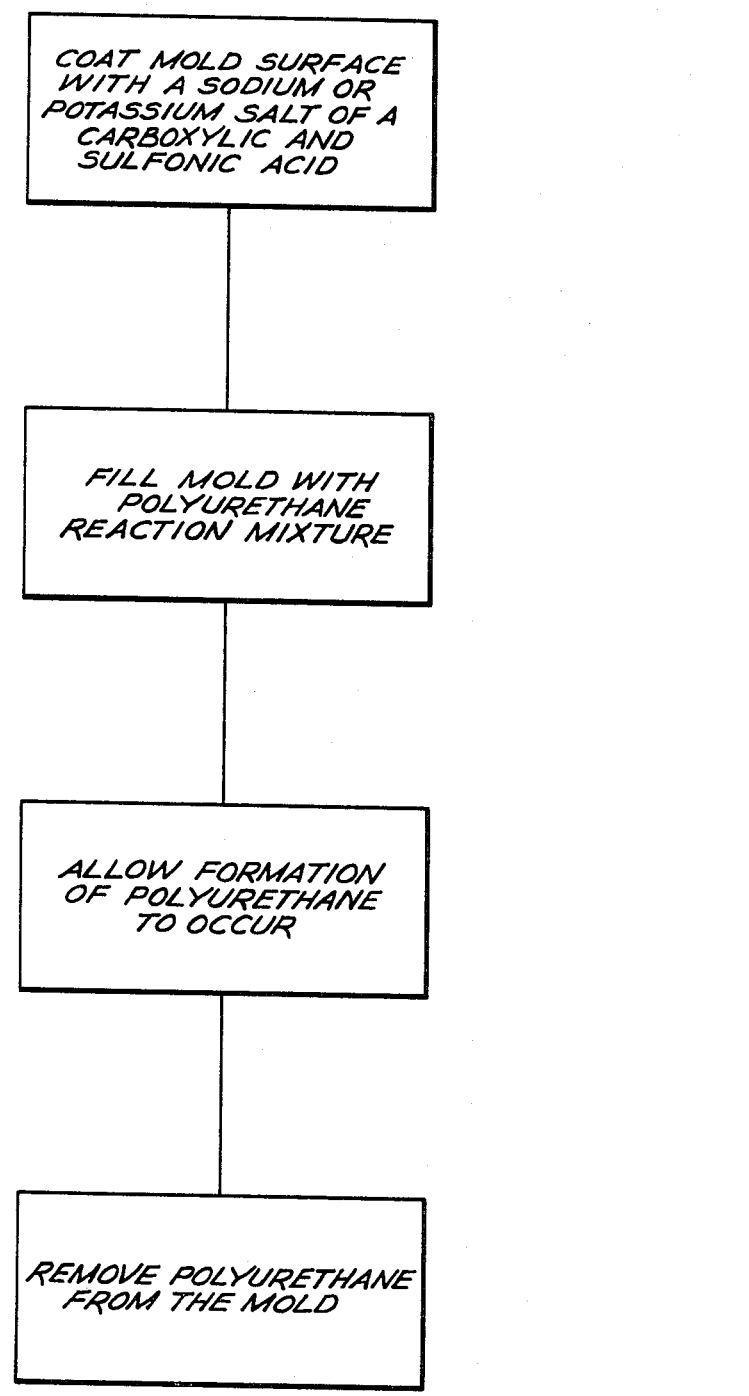

3,413,390
PROCESS OF MOLDING POLYURETHANE PLASTICS
Herbert L. Heiss, New Martinsville, W. Va., assignor to Mobay Chemical Company, Pittsburgh, Pa., a corporation of Delaware
Filed Aug. 19, 1963, Ser. No. 303,165
8 Claims. (Cl. 264—54)

The present invention relates to polyurethane plastics and, more particularly, to an improved method for molding polyurethane plastics.

The manufacture of plastics containing urethane groups is konwn. A polyurethane plastic is prepared by reacting isocyanate groups and active hydrogen containing groups as determinable by the Zerewitinoff method. Whether a cellular polyurethane or an elastomeric polyurethane is produced depends on the particular additives which are added to the reaction mixture. However, no matter what kind of polyurethane is being prepared, it tends to adhere to everything with which it comes in contact. This problem is especially realized when a polyurethane plastic is being molded, for it inherently wants to stick to everything it touches. Difficulty is encountered when molded polyurethane items are released from their molds, and release usually cannot be accomplished without first treating the mold surfaces with a mold release agent.

Many varieties of mold release agents have been employed to facilitate removal of the polyurethanes, such as, for example, wax oil, and soap type agents, such as, paraffin wax, carnauba wax, silicone oils, and the like. Several types of polyurethanes respond quite well as far as release from these commonly known wax, oil, and soap type agents is concerned. However, millable and thermoplastic type polyurethanes do not release well from these commonly known agents. Not only are these commonly known agents unreliable in this particular situation, but the appearance of the molded item is sometimes spoiled.

It is an object of this invention to provide an improved method for molding polyurethanes. It is another object of this invention to provide an improved method for releasing polyurethanes from a mold. It is still another object of this invention to prevent millable, thermoplastic, cast, and cellular polyurethanes from sticking to the mold surface. It is a further object of this invention to provide a mold release agent suitable for use when molding all types of polyurethanes, particularly millable and thermoplastic type polyurethanes.

The accompanying flow sheet illustrates the process disclosed and claimed.

The foregoing objects and others which will become apparent from the following description are accomplished in accordance with the invention, generally speaking, by providing mold release agents suitable for use when molding polyurethanes, particularly millable and thermoplastic type polyurethanes, and these mold release agents are the amide containing sodium or potassium salts of carboxylic and sulfonic acids, such as, for example, those salts represented by the formulas:

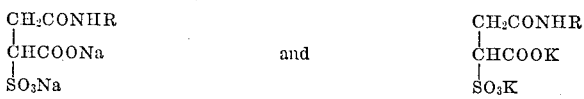

wherein R is an alkyl group having from about 4 to about 20 carbon atoms, such as, for example, butyl, buteneyl, pentyl, hexyl, hexeneyl, heptyl, octyl, nonyl, decyl, undecyl, dodecyl, tridecyl, tetradecyl, pentadecyl, hexadecyl, heptadecyl, octadecyl, nonadecyl, eicosyl; isomeric mixtures thereof, such as, for example, 3-methylpentyl, 2,3,5-trimethylhexyl, 2,7,8 - trimethyldecyl, 5-methyl-4-propylnonyl, mixtures thereof, and the like.

For example, where R is 18, the formula appears as follows:

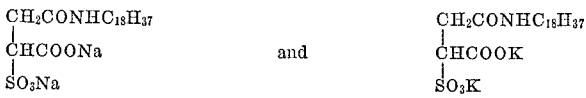

Thus, this invention contemplates a method for making a polyurethane plastic which involves mixing the components of a polyurethane, placing the polyurethane reaction mixture into a mold which has been coated with one of the aforementioned mold release agents, allowing the reaction components of the polyurethane to react to form a polyurethane product and removing or releasing the finished polyurethane from the mold.

Any suitable amide containing a sodium or potassium salt of a carboxylic and a sulfonic acid can be used as a mold release agent when practicing the present invention, such as, for example, disodium N(octadecyl) sulfosuccinamate, dipotassium N(octadecyl) sulfosuccinamate, disodium N(octyl) sulfosuccinamate, dipotassium N(octyl) sulfosuccinamate, disodium N(dodecyl) sulfosuccinamate, dipotassium N(dodecyl) sulfosuccinamate, disodium N(pentyl) sulfosuccinamate, dipotassium N(pentyl) sulfosuccinamate, mixtures thereof, and the like.

The mold release agents mentioned above can be applied to a mold in any suitable manner, such as, for example, by brushing, spraying, dipping the mold into a coating solution, and the like. The concentration of the mold release agent in a liquid medium can vary without departing from the spirit of the invention. For example, about 1% of a mold release agent in the liquid medium can be applied to the mold or the mold release agent can be applied in a paste-like consistency onto the mold. It is sometimes preferred to preheat the mold so that any liquid medium that is employed will be rapidly flashed. When an organic solvent is employed, it is preferred to employ one which has a low boiling point and which is non-combustible, for it will evaporate after it has been applied to the mold. Any suitable liquid medium can be used, such as, for example, benzene, toluene, exylene, methylene chloride, ethylene chloride, chloroform, carbon tetrachloride, and the like. Water can also be employed and is preferred for reasons of safety, toxicity, and cost.

Polyurethane prepared in accordance with this invention are advantageous in that no difficulty is experienced in any of the processing procedures for removing the finished article from the mold. Any desired configuration of mold can be used, such as, for example, slab type molds when a solid slab of a polyurethane is being prepared, castings, injection molds, and the like.

The mold release agents of the present invention are suitable for use with any type of polyurethane; however, they are particularly suitable for use in molding millable and thermoplastic type polyurethanes as these materials present the most serious problems, such as, for example, those prepared by reacting an organic compound having reactive hydrogens, such as, a polyester, a polyether, and the like, and a chain extender with slightly less than a stoichiometric amount of an organic polyisocyanate as that required to react with all of the active hydrogens. This mixture is allowed to react, and when the reaction is substantially complete, the gum is milled on a mill such as that used in the rubber industry, where an additional amount of isocyanate is added to completely cure the gum. After the gum has been cured, it can be formed by extrusion, transfer molding, injection molding, compression molding, and the like, provided an amide containing a sodium or a potassium salt of a carboxylic and a sulfonic acid is used as a mold release agent so that the polyurethane does not stick to the mold surface. Not only is release from the mold facilitated by the use of the mold release agents of the present invention, the surface appearance of the molded article is not marred by the releasing procedure. The mold release agents of the present invention will not discolor the polyurethane being molded nor will they build up objectionable deposits on the mold surface.

Any suitable organic polyisocyanate may be used in the process of this invention for the preparation of polyurethane plastics, such as, for example, aliphatic, aromatic alicyclic, and heterocyclic polyisocyanates including, such as, for example, ethylene diisocyanate, ethylidene diisocyanate, propylene diisocyanate, butylene diisocyanate, cyclopentylene - 1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate 2,2 - diphenylpropane - 4,4' - diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene - 4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1 - chloro - benzene-2,4-diisocyanate, furfurylidene diisocyanate, triphenyl methane triisocyanate, and the like.

Any suitable organic compound containing active hydrogen containing groups in the molecule as determined by the Zerewitinoff method and having a molecular weight of at least about 600 may also be used, such as, for example, hydroxyl polyesters, polyhydric polyalkylene ethers, polyhydric polythioethers, polyacetals, and polyester amides. It is preferred that the organic compounds containing active hydrogen containing groups suitable for use in the process of this invention have a molecular weight of at least about 600 and, most preferably, within the range of about 1,000 to 5,000, an hydroxyl number of not more than about 225 and preferably within the range of about 20 to 112, and acid numbers, where applicable, preferably below and about 10 and, most preferably, below about 2.

Any suitable hydroxyl polyester may be used, such as, for example, the reaction product of a polycarboxylic acid and a polyhydric alcohol. Any suitable polycarboxylic acid may be used in the preparation of polyesters, such as, for example, adipic acid, succinic acid, suberic acid, sebacic acid, methyl-adipic acid, glutaric acid, pimelic acid, azelaic acid phthalic acid, terephthalic acid, isophthalic acid, thiodiglycollic acid, thiodipropionic acid, maleic acid, fumaric acid, citraconic acid, itaconic acid, 1,2,4-benzene-tricarboxylic acid, and the like. Any suitable polyhydric alcohol may be used in the reaction with the polycarboxylic acid to form a polyester, such as, for example, ethylene glycol, propylene glycol, butylene glycol, hexanediol, bis-(hydroxymethyl - cyclohexane), 1,4 - butanediol, diethylene glycol, 2,2 - dimethyl propylene glycol, 1,3 - propylene glycol, trimethyolpropane, glycerine, amino ethyl alcohol, and the like.

The polyester can also be a polyester amide, such as, for example, the reaction product of an amine, such as, ethylene diamine, and an alkylene glycol, such as, ethylene glycol, with a polycarboxylic acid as disclosed for the preparation of the hydroxyl polyesters.

Any suitable polyhydric polyalkylene ether may be used, such as, for example, the condensation product of an alkylene oxide with a small amount of a compound containing active hydrogen containing groups, such as, for example, water, ethylene glycol, propylene glycol, butylene glycol, amylene glycol, ammonia, trimethylolpropane, glycerine, aminoethyl alcohol, and the like. Any suitable alkylene oxide condensate may also be used, such as, for example, the condensates of ethylene oxide, propylene oxide, butylene oxide, amylene oxide, and mixtures thereof. The polyalkylene ethers prepared from tetrahydrofuran may also be used. The polyhydric polyalkylene ethers may be prepared by any known process, such as, for example, the process described by Wurtz in 1859 and in the Encyclopedia of Chemical Technology, volume 7, pages 257 to 262, published by Interscience Publishers in 1951, or in U.S. Patent 1,922,459.

Any suitable polyhydric polythioether may be used, such as, for example, the reaction product of one of the aforementioned alkylene oxides used in the preparation of the polyhydric polyalkylene ether with a polyhydric thioether, such as, for example, thiodiglycol, bis (3-hydroxypropyl) sulfide, bis (4-hydroxybutyl) sulfide, 1,4-(b-hydroxyethyl) phenylene dithioether, and the like.

Any suitable polyacetal may be used, such as, for example, the reaction product of an aldehyde, such as, for example, formaldehyde, with a polyhydric alcohol, such as, for example, ethylene glycol or one of the other polyhydric alcohols disclosed above for the reaction with the polycarboxylic acids and/or alkylene oxides used in the preparation of the hydroxyl polyesters and polyethers, respectively.

Any suitable chain extending agent having a maximum molecular weight of about 500 and having active hydrogen containing groups reactive with isocyanate groups may be used, such as, for example, water, hydrazine, diols including ethylene glycol, propylene glycol, butylene glycol, 1,4-butanediol, butenediol, butynediol, xylylene glycols, amylene glycols, 1,4 - phenylene - bis - b-hydroxy ethylether, 1,3-phenylene-bis-b-hydroxy ethyl ether, bis- (hydroxymethyl cyclohexane), hexanediol, thiodiglycol, and the like; diamines including ethylene diamine, propylene diamine, butylene diamine, hexamethylene diamine, cyclohexylene diamine, phenylene diamine, tolylene diamine, vylylene diamine, 3,3'-dichlorobenzidine, 3,3'-dinitrobenzidine, carbodihydrazide, carboxylic acid dihydrazide, such as, adipic acid dihydrazide, and the like; alkanol amines, such as, for example, ethanol amine, aminopropyl alcohol, 2,2-dimethyl propanol amine, 3-aminocyclohexyl alcohol, p-amino benzyl alcohol, glycerine, trimethylolpropane, hexanetriol, pentaerythritol, and the like, and also mixtures of any of the above extenders.

It is often advantageous to carry out the reaction in the presence of a catalyst. Any suitable catalyst may be used, such as, for example, dibutyl tin di-2-ethyl hexoate, stannous octoate, triethylene diamine, N-ethyl morpholine, N-methyl morpholine, dimethyllauryl amine, ferric acetylacetonate, mixtures thereof, and any other catalyst which will promote the reaction between isocyanate groups and active hydrogen atoms as determinable by the Zerewitinoff method, such as, those disclosed in "Catalysis of the Isocyanate-Hydroxyl Reaction," J. W. Britain and P. G. Gemeinhardt, Journal of Applied Polymer Science, volume IV, issue No. 11, pages 207–211 (1960).

When a cellular polyurethane is prepared, any suitable blowing agent can be used in conjunction with the balance of the components of the cellular polyurethane plastic. Any suitable blowing agent can be used, such as, for example, water, halo hydrocarbons, either alone or with water, such as, for example, dichlorodifluoromethane, trichlorofluoromethane, dichlorofluoromethane, dichlorotetrafluoroethane, and the like.

Cellular polyurethanes can be shaped by the present invention into items, such as, for example, furniture cushions, pillows, bedding, topper pads, and the like. Elastomeric polyurethanes prepared according to the present invention can be shaped into tires, inner tubes, belts, hose and tubing, wire, footwear, golf balls, gaskets, floor mats, dipped goods, and the like.

The invention is further illustrated by the following examples in which the parts and percentages are by weight unless otherwise specified.

Example 1

About 2420 parts (2.42 equivalents) of a polypropylene ether glycol having a molecular weight of about 2,000 and an hydroxyl number of about 56, about 189.0 parts (4.20 equivalents) of 1,4-butanediol, about 30.4 parts (3.38 equivalents) of water, about 825.0 parts (9.50 equivalents) of an isomeric mixture of 80% 2,4-tolylene diisocyanate and 20% 2,6-tolylene diisocyanate and about 12.1 parts of stannous octoate are mixed together by means of a high speed propeller-type agitator for about 30 seconds. The mixture is then poured into a polypropylene tray. The tray and polyurethane reaction mixture are placed in an oven maintained at about 90° C. for about two hours to insure complete reaction. The reaction mixture initially foams and shortly thereafter, within 10 to 15 minutes, collapses to yield a solid polymer.

The gum is then milled on a suitable mill such as that used in the rubber industry with the addition of 7.5 parts of 4,4′-diphenylmethane diisocyanate per one hundred parts of the gum. The gum mills easily and softens readily on a hot mill. The gum is cured for about 30 minutes at a temperature of about 280° F. in a compression mold treated with disodium N(octadecyl) sulfosuccinamate and, after curing, has a tensile strength of 3,300 p.s.i. and an elongation of 700%.

Example 2

About 1360 parts (1.36 equivalents) of a polypropylene ether glycol having a molecular weight of about 2,000 and an hydroxyl number of about 56, about 250 parts (0.25 equivalent) of a trihydric polypropylene ether obtained from propylene oxide condensed on glycerine to a molecular weight of about 3,000 and having an hydroxyl number of about 56, about 126 parts (2.80 equivalents) of 1,4-butanediol, about 18 parts (2.0 equivalents) of water, about 533 parts (6.09 equivalents) of an isomeric mixture of 80%, 2,4-tolylene diisocyanate and 20% 2,6-tolylene diisocyanate and about 8.0 parts of stannous octoate are intimately combined in the manner set forth in Example 1. The process of Example 1 is then followed to produce a gum which has good milling properties. This gum is cured with 7.5 parts per hundred of tolylene diisocyanate dimer for about 30 minutes at about 280° C. in a coated mold and exhibits good physical properties.

Example 3

A mold and cover for the mold are coated with a 1% aqueous solution of dipotassium N(dodecyl) sulfosuccinamate after which a cellular polyurethane reaction mixture is poured therein. The reaction mixutre is prepared from about 100 parts of polypropylene glycol (OH number 59), about 39 parts of tolylene diisocyanate (the mixture of 2,4- and 2,6-isomers in the ratio of 80:20), about 3 parts of water, about 1.2 parts of a water-soluble polysiloxane-polyalkylene oxide copolymer, about 0.1 part of stannic dibutyl-laurate, and about 0.5 part of N-methyl-N′-dimethylaminoethyl-piperazine. The reaction mixture is permitted to foam and solidify. No difficulty is experienced in separating the foam from the mold.

It is to be understood that any suitable organic polyisocyanate, organic compound containing active hydrogen atoms, chain extenders, blowing agents, catalysts, stabilizers, and the like described herein can be substituted for the particular ones employed in the preceding examples with satisfactory results. Moreover, any suitable amide containing a sodium or potassium salt of a carboxylic and a sulfonic acid can also be substituted for the particular ones employed in the preceding examples with satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A method for molding polyurethane plastics comprising coating a mold surface with a mold release agent, said mold release agent being an amide containing a member selected from the group consisting of sodium and potassium salts of carboxylic and sulfonic acids, inserting a polyurethane reaction mixture into said mold coated with said mold release agent, allowing the reaction mixture to react and easily releasing the resulting polyurethane from the said mold.

2. A method for molding polyurethane plastics comprising coating a mold surface with a mold release agent, said mold release agent being an amide containing a member selected from the group consisting of sodium and potassium salts of carboxylic and sulfonic acids having the formula:

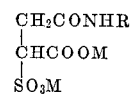

wherein R is an alkyl group having from about 4 to about 20 carbon atoms and M is a member selected from the group consisting of sodium and potassium, inserting a polyurethane reaction mixture into said mold coated with said mold re'ease agent, allowing the reaction mixture to react and easily releasing the resulting polyurethane from the said mold.

3. A method for molding polyurethane plastics comprising coating a mold surface with a mold release agent, said mold release agent being an amide containing a member selected from the group consisting of sodium and potassium salts of carboxylic and sulfonic acids having the formula:

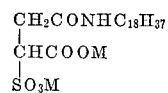

wherein M is a member selected from the group consisting of sodium and potassium, inserting a polyurethane reaction mixture into said mold coated with said mold release agent, allowing the reaction mixture to react and easily releasing the resulting polyurethane from the said mold.

4. The process of claim 2 wherein the polyurethane reaction mixture comprises an organic compound containing active hydrogen atoms which are reactive with —NCO groups and having a molecular weight of at least 600 and an organic polyisocyanate.

5. The process of claim 2 wherein the polyurethane reaction mixture comprises an organic compound containing active hydrogen atoms which are reactive with —NCO groups and having a molecular weight of at least 600 and an organic polyisocyanate and a compound having a molecular weight less than 500 and selected from the group consisting of water, hydrazine, glycols, diamines, and amino alcohols.

6. In the molding of a polyurethane plastic by a process which comprises coating a mold surface with a mold release agent, placing a polyurethane reaction mixture into said mold, allowing the reaction mixture to react, and then removing the molded product from the said mold, the improvement which comprises employing as said mold release agent a member selected from the group consisting of sodium and potassium salts of carboxylic and sulfonic acids.

7. In the molding of a polyurethane plastic by a process which comprises coating a mold surface with a mold release agent, placing a polyurethane reaction mixture into said mold, allowing the reaction mixture to react, and then removing the molded product from the said mold, the improvement which comprises employing as the said mold release agent a member selected from the group consisting of sodium and potassium salts of carboxylic and sulfonic acids having the formula:

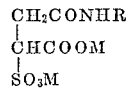

wherein R is an alkyl group having from about 4 to about 20 carbon atoms and M is a member selected from the group consisting of sodium and potassium.

8. In the molding of a polyurethane plastic by a process which comprises coating a mold surface with a mold release agent, placing a polyurethane reaction mixture into said mold, allowing the reaction mixture to react, and then removing the molded product from the said mold, the improvement which comprises employing as the said mold release agent a member selected from the group consisting of sodium and potassium salts of carboxylic and sulfonic acids having the formula:

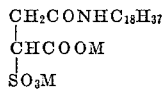

wherein M is a member selected from the group consisting of sodium and potassium.

References Cited

UNITED STATES PATENTS

| | | | |
|---|---|---|---|
| 3,101,244 | 8/1963 | Hood et al. | 264—338 X |
| 3,127,457 | 3/1964 | Di Pinto | 264—338 X |
| 3,210,448 | 10/1965 | Szabat | 264—54 X |
| 2,833,658 | 5/1958 | May | 106—38.24 |
| 2,976,160 | 3/1961 | Fronczak et al. | 106—38.24 |
| 2,880,219 | 3/1959 | Burnette et al. | 260—401 |
| 2,974,153 | 3/1961 | Gajewski et al. | 260—401 |
| 2,772,141 | 11/1956 | Dunlap | 264—338 |
| 2,801,150 | 7/1957 | Koryta | 264—338 |

FOREIGN PATENTS 624,114  7/1961  Canada.

JULIUS FROME, *Primary Examiner.*

PHILIP E. ANDERSON, *Assistant Examiner.*